United States Patent [19]
Feldmann et al.

[11] Patent Number: 5,031,716
[45] Date of Patent: Jul. 16, 1991

[54] VEHICLE DRIVE ENGAGEMENT CONTROL AND SPEED GOVERNOR SYSTEM

[75] Inventors: Joachim Feldmann, Neustadt; Erwin Petersen, Wunstorf, both of Fed. Rep. of Germany

[73] Assignee: WABCO Standard GmbH, Hanover, Fed. Rep. of Germany

[21] Appl. No.: 362,295

[22] Filed: Jun. 6, 1989

[30] Foreign Application Priority Data

Jun. 16, 1988 [DE] Fed. Rep. of Germany ....... 3820468
Dec. 16, 1988 [DE] Fed. Rep. of Germany ....... 3842348

[51] Int. Cl.$^5$ .............................................. B60K 28/16
[52] U.S. Cl. ................................... 180/197; 123/352; 364/426.02
[58] Field of Search ................. 180/197; 123/352, 357; 364/426.02

[56] References Cited

U.S. PATENT DOCUMENTS

| | | | |
|---|---|---|---|
| 4,190,026 | 2/1980 | Sakakibara | 123/352 |
| 4,474,155 | 10/1984 | Sagues | 123/352 |
| 4,685,547 | 8/1987 | Ohashi et al. | 192/1.21 |
| 4,811,809 | 3/1989 | Reinartz et al. | 180/197 |

OTHER PUBLICATIONS

Wabco-Druckschrift, "Das Integrierte Sicherheitssystem für Nutzfahrzeuge, Anti-Blockier-System ABS mit Antriebs-Schlupf-Regelung ASR", Ausgabe März 1989.
Wabco publication Mar. 1987, "The Integrated Safety System for Commercial Vehicles".

*Primary Examiner*—Charles A. Marmor
*Assistant Examiner*—Mitchell Bompey
*Attorney, Agent, or Firm*—Horst M. Kasper

[57] ABSTRACT

The present invention provides a drive engagement control and speed governor system for a vehicle which is capable of adapting a prior art system, known as a DEC/G system, to different types of vehicles. To accomplish this, the invention provides a valve system having fluid pressure delivery as a function of the magnitude of the control signal fed by an electronic control system. According to this invention, the electronic control system transmits a control signal to the valve system which is only sufficient to eliminate the spinning of a drive wheel on such vehicle or to eliminate exceeding of a predetermined maximum speed by an operator of such vehicle.

45 Claims, 4 Drawing Sheets

VEHICLE DRIVE ENGAGEMENT CONTROL AND SPEED GOVERNOR SYSTEM

FIELD OF THE INVENTION

The present invention relates, in general, to vehicle control systems and, more particularly, this invention relates to a drive engagement control and speed governor system which substantially eliminates a drive wheel spin of at least one driven wheel and the exceeding of a predetermined maximum speed limit by an operator of such vehicle.

BACKGROUND OF THE INVENTION

A combination drive engagement control and speed governor system has been taught in the prior art. See, for example, FIG. 21 of the Mar., 1987, Edition of the WABCO Publication entitled, "The Integrated Safety System for Commercial Vehicles", "Antilocking System ABS With Drive Engagement Regulator ASR". The valve system that is provided in this prior art arrangement of the control system is a combination of electrically actuated "so-called" distributing valves, that is, valves of the type which will only permit the operational states of "completely open" and "completely closed". Therefore, in spite of this, in order to essentially guarantee the vehicle operator a comfortable drive engagement control, the system must include an arrangement of restrictors and additional volumes connected in series (either upstream or downstream) with the particular distribution valve that is assigned this function. In FIG. 21 of this prior art publication, this distributing valve is identified as 10. Furthermore, this system must be specifically adjusted to the particular requirements encountered with various types of vehicles. Therefore, the adaptation of this known prior art drive engagement control and speed governor system to different types of vehicles and/or to new and/or improved developments of these would generally be expected to be rather elaborate and expensive for any individual case.

SUMMARY OF THE INVENTION

The present invention provides an apparatus for controlling a drive wheel spin of at least one driven wheel and for providing a drive speed limitation capability on a vehicle. This apparatus includes a control means positionable on such vehicle for the determination of at least one predetermined operational condition of an engine mounted on the vehicle. An acceleration control means is positioned on the vehicle which enables an operator of the vehicle to control both an acceleration and a maintenance of a speed of the vehicle during operation thereof. A linkage means positionable on such vehicle connects the acceleration control means with such control means. A fluid pressure-actuated control cylinder is disposed in such linkage means intermediate the acceleration control means and the control means. A fluid pressure supply means is positioned on the vehicle and is connected to such fluid pressure-actuated control cylinder for supplying fluid pressure thereto. An electrically activated valve means is positionable on the vehicle intermediate such fluid pressure supply means and the fluid pressure-actuated control cylinder. Such electrically activated valve means controls fluid communication of a predetermined fluid pressure from such fluid pressure supply means to the fluid pressure-actuated control cylinder when an appropriate control signal is transmitted to the electrically activated valve means. In addition, the apparatus includes an electronic control system positionable on such vehicle. The electronic control system is electrically connected to the electrically activated valve means for transmitting such appropriate control signal to such electrically activated valve means. Such appropriate control signal is transmitted to such electrically activated valve means when at least one of at least one drive wheel on the vehicle spins and a maximum admissible drive speed is exceeded. Such electronic control system responds in a manner such that when at least such one of spin of at least one drive wheel and an excess of such maximum allowable drive speed occurs. The electronic control system adjusts the control signal to a value that is only sufficient to cause such electrically activated valve means to adjust an amount of such predetermined fluid pressure being applied to such fluid pressure-actuated control cylinder to an amount that is only sufficient to eliminate such at least one of such spin of the at least one drive wheel and such excess of the maximum allowable drive speed. A piston member which is positioned for reciprocal movement within such fluid pressure-actuated control cylinder and is connected at one end thereof to said linkage means moves to a predetermined position in response to the amount of such predetermined fluid pressure being supplied thereto. Movement of the piston member brings about a change in the relative position of at least a portion of the linkage means. The change in the relative position of such at least a portion of the linkage means results in moving the control means in a direction of an idle position (LL) of such engine with an increase in such predetermined fluid pressure being communicated to the fluid pressure-actuated control cylinder. The fluid pressure-actuated control cylinder is capable of making a control stroke which corresponds to movement of such control means between a full load position (VL) and such idle position (LL) of the engine mounted on such vehicle.

OBJECTS OF THE INVENTION

It is, therefore, one of the primary objects of the present invention to provide a drive engagement control and speed governor system which can be adapted by rather simple measures to various types of vehicles.

Another object of the present invention is to provide a drive engagement control and speed governor apparatus which can be manufactured rather economically for various vehicles types.

Still another object of the present invention is to provide a drive engagement control and speed governor apparatus which does not require the use of restrictors and additional volumes in the system to enable use on a variety of vehicles.

Yet another object of the present invention is to provide a drive engagement control and speed governor apparatus which replaces three separate distributing valves required in the prior art system with a single valve device.

In addition to the various objects and advantages of the drive engagement control and speed governing system of the present invention, various other objects and advantages of such invention will become more readily apparent to those persons skilled in the vehicle control art from the following more detailed description of the invention when such description is taken in conjunction with the attached drawing figures and with the appended claims.

BRIEF DESCRIPTION OF THE INVENTION

Figure 1:
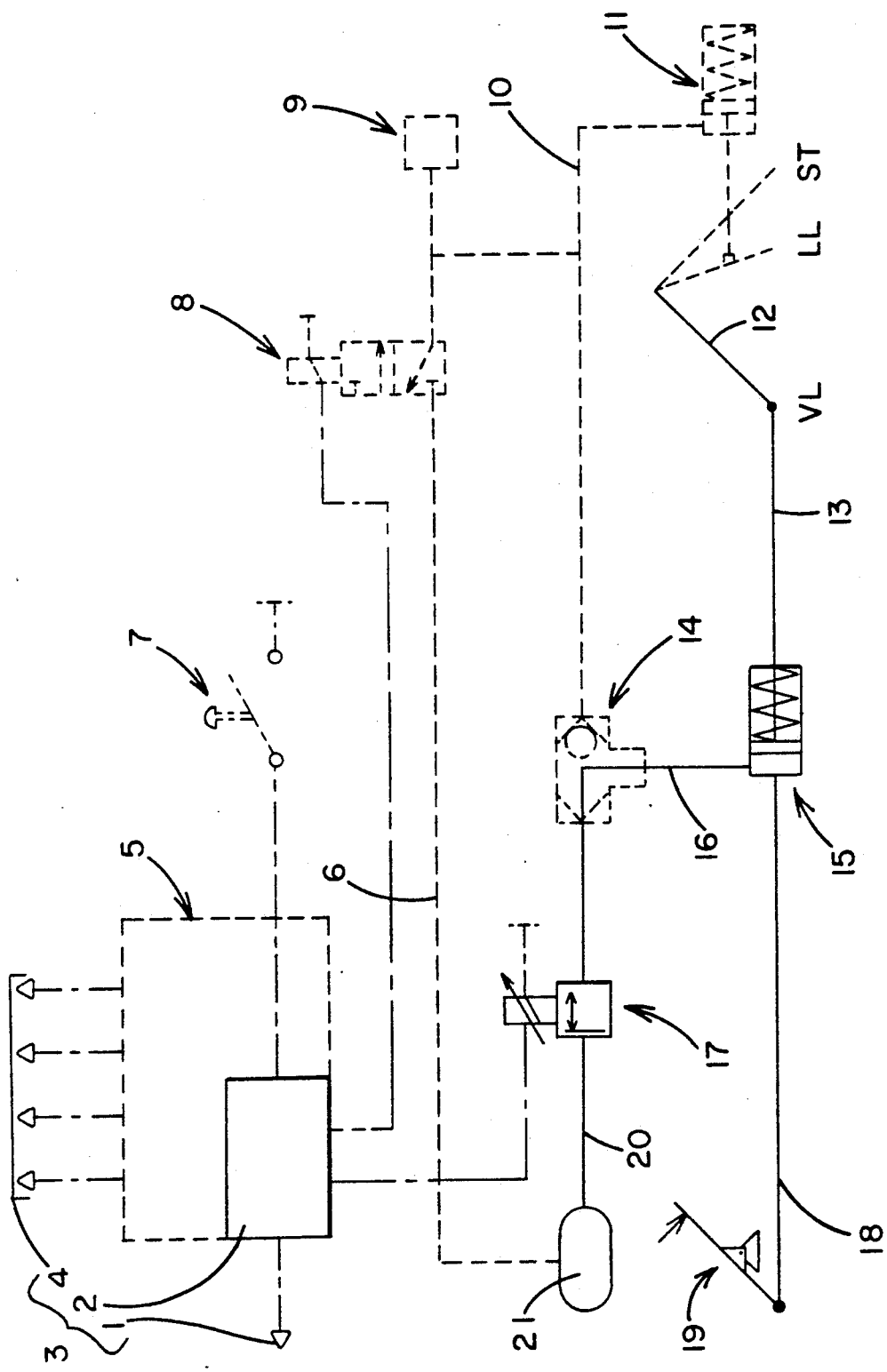
FIG. 1 is a schematic illustration of one presently preferred embodiment of a combination of a drive engagement control and a speed governor system, constructed according to the present invention, in conjunction with other existing components of a vehicle system.

Prior to proceeding to the more detailed description of the present invention, it should be noted that identical components having identical functions have been identified with identical reference numerals throughout the several views of the drawings. It should, likewise, be noted that electrical connections have been illustrated in each of the drawing figures with broken lines.

Now refer more particularly to the drawings. Illustrated in FIG. 1, there is a fluid pressure-actuated control cylinder 15, an electrically activated valve means 17, and an electronic control system 3. These three components, in combination with one another, represent a drive engagement control and speed governor system 3, 15 and 17. In the following description of this invention, such drive engagement control and speed governor system will be referred to as the DEC/G system 3, 15 and 17. It should be noted here that although the fluid pressure-actuated control cylinder 15 may be utilized in a hydraulic fluid pressure system, it is presently preferred that such fluid pressure system be pneumatic.

As is generally known in the vehicle art, the DEC/G system 3, 15 and 17 is provided to control spin of a drive wheel and to provide a drive speed limitation capability on a vehicle.

In the DEC/G system 3, 15 and 17 of the present invention, the fluid pressure-actuated control cylinder 15 is positioned intermediate the opposed ends of a linkage means consisting of at least two linkage members 13 and 18. A first end of one of such linkage members comprising such linkage means 13 and 18 disposed on one end of a second one of such linkage members is connected to an acceleration control means 19. In the presently preferred embodiment of the invention, such acceleration control means 19 is a pedal secured to the vehicle in a position to be operated by the foot of the driver of such vehicle. The opposed second end of such linkage means 13 and 18 disposed on one end of a second one of such linkage members is connected to a control means 12. The control means 12 determines the operating state of the engine of such vehicle, particularly at least one predetermined operational condition of such engine. During operation of the DEC/G system 3, 15 and 17, the control means 12 can be moved between an idling position, designated (LL) in the drawings, and a full load position, designated (VL).

The fluid pressure-actuated control cylinder 15 is capable of producing within a predetermined variable stroke range, when starting from a neutral position, a stroke that depends upon the amount of fluid pressure fed to such control cylinder 15. The control stroke of the fluid pressure-actuated control cylinder 15 generally corresponds to the travel distance of the control means 12 between the full load position (VL) and the idling position (LL). As used hereinafter in the specification and claims, the control stroke pressure shall be understood to mean the fluid pressure at which such fluid pressure-actuated control cylinder 15 makes such control stroke. With one stroke of the piston member disposed for reciprocal movement within the fluid pressure-actuated control cylinder 15, such fluid pressure-actuated control cylinder 15 causes a change in the position of the linkage member portion 13 of the linkage means 13 and 18 and, as a result, moves the control means 12 toward the idling position (LL). This action of the linkage means 13 and 18 occurs independently of the relative position of the acceleration control means 19. Of course, as will be understood by persons skilled in the art, if the order of the control procedure is reversed, the fluid pressure-actuated control cylinder 15 must be positioned so that a shortening of the linkage means 13 and 18 will occur.

In this embodiment of the invention, an electrically activated valve means 17 is provided as part of the DEC/G system 3, 15 and 17 to control the application of the preselected fluid pressure to such fluid pressure-actuated control cylinder 15. When an appropriate control signal is applied, which, in the following discussion the control signal shall be assumed to be a signal current by way of example, the electrically activated valve means 17 links the fluid pressure-actuated control cylinder 15 with a fluid pressure medium supply source 21 via a pipeline system 16 and 20. Such fluid pressure medium supply source 21 is filled to a predetermined storage pressure in a conventional manner. The electrically activated valve means 17 is configured such that it selects from the fluid pressure medium supply source 21 a fluid pressure that depends on the signal current. In the presently preferred embodiment, the electrically activated valve means 17 is linearly dependent, i. e., a proportional valve. However, other valve means which include any other adequate signal current to a fluid pressure characteristic may also be employed without departing from the spirit or scope of the invention.

An electronic control system 3 is provided. Such electronic control system 3 is electrically connected to such electrically activated valve means 17 so that a signal current may be applied to such electrically activated valve means 17. The electronic control system 3 includes at least an analyzer portion 2 as well as at least one sensor 1 or 4. The at least one sensor 1 or 4 is designed and functions in a known manner for determining drive speed. In the following description, such sensor or 4 will be referred to as a speed sensor. In addition, such sensor 1 or 4 may function to determine the wheel rotating velocity, or the like, of at least one drive wheel. In the following description, such sensor 1 or 4, respectively, will be referred to as a wheel velocity sensor.

The DEC/G system 3, 15 and 17 in conjunction with the other components of this particular embodiment of the invention, which have been described thus far, interact in the following manner.

By way of the combination of each of the acceleration control means 19, the linkage means 13 and 18, and the fluid pressure-actuated control cylinder 15, the operator of the vehicle can make a determination of the position of the control means 12 between the idling position (LL) and the full load position (VL). If the analyzer portion 2 of the electronic control system 3, with the help of the wheel velocity sensor 4, detects the spinning condition of a driven wheel or of several driven wheels, then the electronic control system 3, specifically the analyzer portion 2, will be actuated. Upon actuation, the electronic control system 3 then transmits a signal current to the electrically activated valve means 17. In turn, the electrically activated valve mean 17 then transmits a corresponding fluid pressure to the fluid pressure-actuated control cylinder 15. Such spinning of a driven wheel on a vehicle frequently occurs, for example, during start-up of the vehicle. As used in this specification, the term "spinning" is to be understood to mean the exceeding of an upper wheel slip threshold. This upper wheel slip threshold may range, for example, in the magnitude of the wheel slip optimum. The fluid pressure communicated to the fluid pressure-actuated control cylinder 15 from the fluid pressure medium supply source 21 results in such fluid pressure-actuated control cylinder 15 producing a stroke that repositions the linkage member portion 13 of the linkage means 13 and 18 in a manner that will result in movement of the control means 12 toward the idling position (LL). The analyzer portion 2 of the electronic control system 3 is set up in a manner such that during this particular process, such analyzer portion 2 can regulate the signal current so that the movement of the control means 12 toward the idling position (LL) is only sufficient to affect the wheel slip signal. In this case, such signal current is determined by the respective fluid pressure, and thus by the corresponding stroke of the fluid pressure-actuated control cylinder 15. In this manner, regardless of the position of the acceleration control means 19, the engine output can be reduced. However, such reduction in the power output of the engine is not more than the reduction necessary to substantially eliminate the spinning condition of the at least one drive wheel on such vehicle.

For the implementation of this function in the presently preferred embodiment of the invention, the electronic control system 3, and the analyzer portion 2 in particular, are set up so that the signal current transmitted as a control signal is a function of the sensed intensity of the drive wheel spinning. In other words, it is the rate of difference between the actual wheel slip value and the value of the wheel slip threshold. It is to be understood, however, that the electronic control system 3 may be set up in such a way that this dependency can be adapted to certain predetermined modifications of the vehicle and/or to wheel dynamics. For example, such modifications and/or wheel dynamics may occur as the result of changes in the load condition of the vehicle and/or in road conditions which are encountered during operation of the vehicle.

During operation of the DEC/G system 3, 15 and 17, the speed sensor 1 transmits a speed signal in the event of such vehicle exceeding a predetermined maximum speed limit. This transmission of this speed signal by the speed sensor 1 can occur when at least one drive wheel is spinning, or even with normally running drive wheels. As with the drive wheel spinning action discussed above, the electronic control system 3, the electrically activated valve means 17, and the fluid pressure-actuated control cylinder 15 react accordingly until such time the speed signal disappears. The power output of the engine on the vehicle, therefore, is reduced by a rate that is only sufficient to eliminate the excess speed. This occurs when exceeding the predetermined maximum speed limit, regardless of the position of the acceleration control means 19 called for by the driver of the vehicle. Beyond the basic components of the DEC/G system 3, 15 and 17, which have been described thus far, it is possible to further improve and modify such DEC/G system 3, 15 and 17 in various ways. Such improvements and/or modifications are illustrated in FIG. 1 by broken lines.

As the dotted outline 5 in FIG. 1 indicates, such electronic control system 3 may be a part of an antilocking system on vehicles equipped with such antilocking systems. Such antilocking systems are generally referred to in the art as ALS. In that case, the electronic control system 3 can be provided with a minimum amount of additional equipment expenditure for electronic assemblies. More particular, such cost savings can be achieved with the use of wheel velocity sensors already provided as part of the ALS.

The design of the DEC/G system 3, 15 and 17, for example, may be such that the fluid pressure-actuated control cylinder 15 will generally not produce a stroke until a predetermined response pressure has been reached. In addition, the electronic control system 3 is preferably set up such that the minimum signal current such electronic control system 3 can transmit is essentially only sufficient to actuate such electrically activated valve means 17 to communicate the response pressure to the fluid pressure-actuated control cylinder 15. Furthermore, the electronic control system 3, in addition to the setup described above, may be set up in a manner such that it will limit the maximum signal current transmitted to the electrically activated valve means 17 to a value that corresponds to the control stroke pressure. The fluid pressure-actuated control cylinder 15 moves the control means 12 just into the idling position (LL) at this particular control stroke pressure. This movement of the control means 12 into such idling position (LL) occurs even with the acceleration control means 19 fully actuated by the driver of the vehicle. These measures substantially prevent both excess pressure and pressure deficiencies in such fluid pressure-actuated control cylinder 15. The prevention of such excess pressure or pressure deficiencies serves to increase both control quality and comfort of the DEC/G system 3, 15 and 17. Of course, manufacturing and other tolerances, as well as other interferences must be taken into consideration with these measures. In looking at specific numbers, a response pressure of generally about 1 bar and a full-stroke pressure of generally about 5 bar have proven satisfactory in tests.

It is both advantageous and presently preferred that the electronic control system 3 be of the digital type. If such electronic control system 3 transmits a pulse-width modulated current as the signal current, then the mean value of such pulse-width modulated current represents the signal current.

The adaptability of the invented DEC/G system 3, 15 and 17 can be further improved, particularly if the analyzer portion 2 of the electronic control system 3 can be calibrated with respect to the minimum signal current and/or the maximum signal current, as it was discussed above. In order to achieve this calibration feature, the analyzer portion 2 of the electronic control system 3 may be equipped with an adaptive memory feature.

This adaptive memory feature can be achieved with appropriate electronic circuits, for example. An EPROM is one such electronic circuit into which the actual values of the particular vehicle characteristics can be input and stored. Such an EPROM circuit is particularly well suited for carrying out the function in the present invention. The inputting and storage of such vehicle characteristics may be executed, for example, during a calibration process, or during initial installation of the DEC/G system 3, 15 and 17, or during startup.

The refinements of the basic embodiment, illustrated with broken lines in FIG. 1, offer certain desirable advantages for the DEC/G system 3, 15 and 17.

For example, in the case of certain types of vehicles, the control means 12 can be advantageously utilized to stop the engine of such types of vehicles. In this particular case, and as viewed from the direction of the full-load position (VL), the control means 12 can be moved beyond the idling position (LL) into a stopping position designated (ST) in the drawings. In this case, it is also possible to limit the movement of the control means 12 in the idling position (LL). Such movement limit of the control means 12 is accomplished in this embodiment by providing a stop cylinder 11. In addition, limiting the movement of the control means 12 in the above-described manner enables the DEC/G system 3, 15 and 17 to maintain both quality control and comfort. However, the effect of the stop cylinder 11 upon the control means 12 can be cancelled, when necessary, by the application of a reversing pressure to such stop cylinder 11. The application of such reversing pressure to the stop cylinder 11 enables the control means 12 to be moved into such stopping position (ST). In order to provide the following possible advantages for the DEC/G system 3, 15 and 17, the design of the stop cylinder 11 should be such that the reversing pressure is higher than the control stroke pressure. Such reversing pressure may be on the order of 6 bar, for example. The effects which have been described above and to be described below in connection with the reversing pressure equally apply for even higher pressures.

The fluid pressure-actuated control cylinder 15 can be designed in a manner such that under the effect of the reversing pressure, such fluid pressure-actuated control cylinder 15 will produce stroke which goes beyond the control stroke. In so doing, the fluid a pressure-actuated control cylinder 15 further changes the relative position of the linkage member 13 of the linkage means 13 and 18 to move the control means 12 into the stopping position (ST). In order to shut off the engine on the vehicle, according to one presently preferred embodiment of the invention, an engine brake valve means 8 may be provided. Such engine brake valve means 8 is connected to the stop cylinder 11 and to the fluid pressure-actuated control cylinder 15. By way of such engine brake valve means 8, the reversing pressure can be applied to such stop cylinder 11 and parallel to such electrically activated valve means 17 and the fluid pressure-actuated control cylinder 15. The reversing pressure may also be withdrawn from the fluid pressure medium supply source 21 by way of pipelines 6 and 10. Such pipelines 6 and 10 are indicated by broken lines in the drawings. In this case, the storage pressure in such fluid pressure medium supply source 21 must be at least as high as such reversing pressure. The fluid pressure connection of the fluid pressure-actuated control cylinder 15 to the engine brake valve means 8 is effected via a two-way valve means 14. This two-way valve means 14 is provided to ensure the system's parallel position of the electrically activated valve means 17 and such engine brake valve means 8. In the presently preferred embodiment of the invention, such engine brake valve means 8 may be electrically operated and activated by a switchgear 7. As a result, the engine of such vehicle can be shut off electrically. As illustrated in the drawings, the switchgear 7 may precede the electronic control system 3 in series. In this arrangement of the electrical system, the actuation signal for the engine brake valve means 8 is being looped through such electronic control system 3.

As schematically illustrated, an engine brake valve means 9, preferably hydraulic, may also be connected to such engine brake valve means 8. In this particular embodiment, an integrated system comprised of a DEC/G system 3, 15 and 17, an engine shut-down system, and an engine braking system, is provided. In this embodiment of the invention, the engine braking system will function as an engine shut-down system when such engine braking system simultaneously releases the engine clutch.

Additionally, in the present invention the engine braking system can be used to advantage to assist the DEC/G system 3, 15 and 17 if the movement of the control means 12 into the idling position (LL), to be effected by such engine braking system at a maximum signal current transmitted by the electronic control system 3, is not sufficient to substantially eliminate the exceeding of the predetermined maximum speed limit. In this case, the electronic control system 3 is then configured and set up in a manner such that the electrically operated engine brake valve means 8 is operated by such electronic control system 3 instead of by the switchgear 7. This will result in the control means 12 being moved into the stopping position (ST) much the same as with such operation of the engine brake system. In the event that the ALS should become operative during this particular phase, the function of such ALS may be interferred with by the action of the engine brake system.

Of course, this is also equally true in the situation when the ALS becomes operative while such engine braking system is voluntarily operated by way of the switchgear 7. In these particular cases, it is possible, when the antilocking operation is completed, to reduce the danger of an unstable driving condition due to the restoration of the motor braking system by setting up and configuring the electronic control system 3 accordingly. In these instances, the electronic control system 3 is set up in a manner so that after completion of the antilocking operation by the ALS, and prior to a reactuation of the engine brake valve means 8, such electronic control system 3 will transmit to the electrically activated valve means 17 in a first stage, only the signal current that will be sufficient to move the control means 12 into the idling position (LL).

Figure 2:
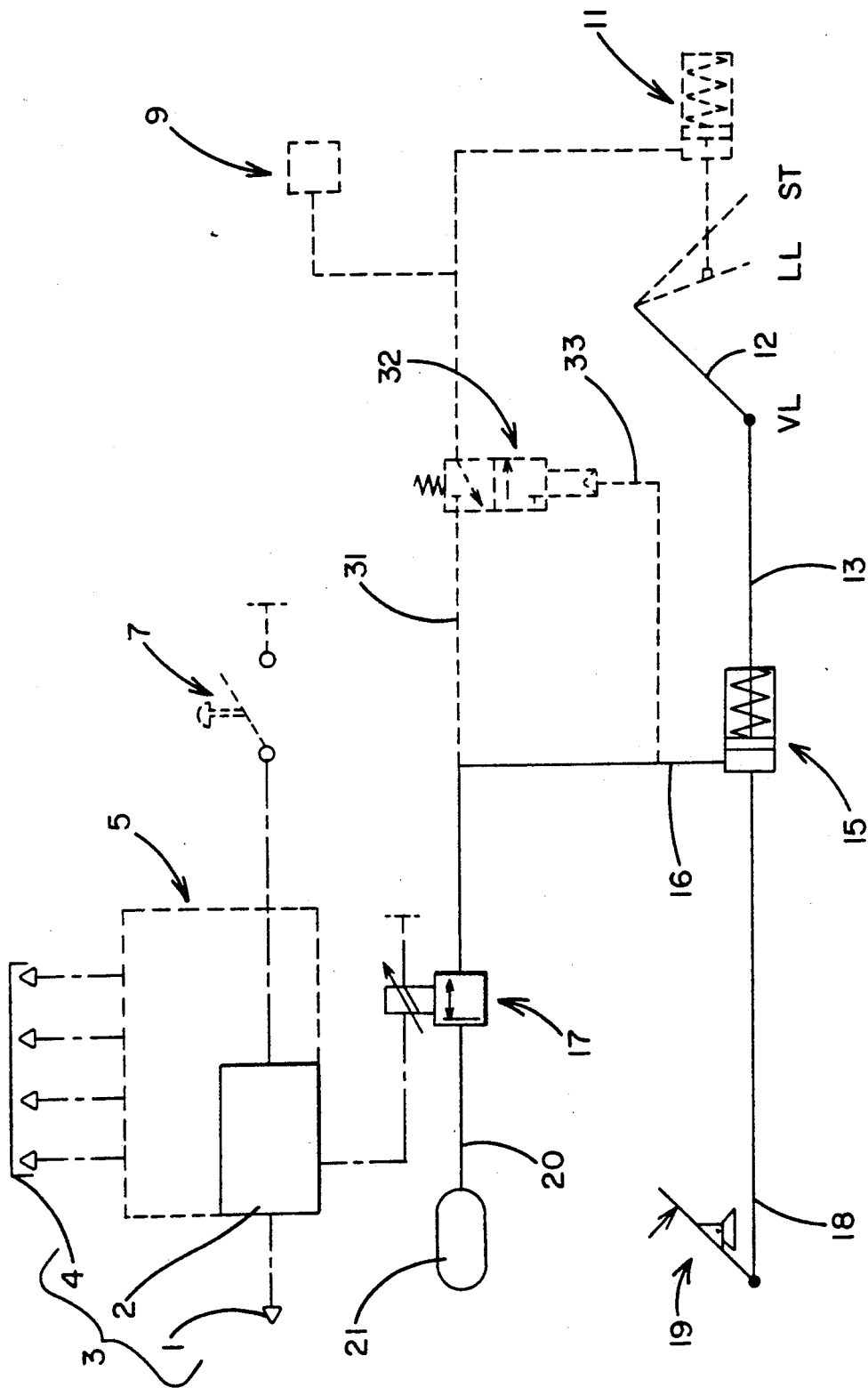
FIG. 2 is a schematic illustration of an alternative embodiment of the combination drive engagement control and speed governor system illustrated in FIG. 1.

Now refer more particularly to FIG. 2. The embodiment of the invention illustrated in FIG. 2 differs from the embodiment illustrated in FIG. 1 by providing a different design of the engine shut-down device and the engine braking device. In the embodiment of FIG. 1, the electrically operated engine brake valve means 8 is replaced by a fluid pressure-controlled reversing valve means 32. Preferably such fluid pressure-controlled reversing valve means 32 is also a distributing valve. The fluid pressure-controlled reversing valve means 32, as is known in the valve art, is designed in a manner such that when the reversing pressure is applied to its control connection, such fluid pressure-controlled reversing valve means 32 allows free passage of fluid pressure, but otherwise it is closed with pressure relief at the outlet of such fluid pressure-controlled reversing valve means 32. At the intake and at the control connection of the fluid pressure-controlled reversing valve means 32, such fluid pressure-controlled reversing valve means 32 is connected by way of fluid pressure, preferably hydraulic, by way of fluid pressure lines 31 or 33 with the fluid pressure line 16 of the fluid pressure communication pipeline system 16 and 20 located between the electrically activated valve means 17 and the fluid pressure-actuated control cylinder 15. To voluntarily operate the engine braking system and the engine shut-down system, a switchgear 7 is provided. The switchgear 7 actuation signal can be passed through the electronic control system 3 in the same manner as in the embodiment illustrated in FIG. 1, and as discussed above.

When the switchgear 7 is activated, the electronic control system 3 selects a signal current to be transmitted to the electrically activated valve means 17. This signal current activates the electrically activated valve means 17 to select the reversing pressure. Activation of the electrically activated valve means 17 causes reversing pressure to be communicated to the fluid pressure line 16, the fluid pressure-actuated control cylinder 15, as well as to the intake and the control connection of the fluid pressure-controlled reversing valve 32 by way of the fluid pressure lines 31 or 33. This places the fluid pressure-controlled reversing valve means 32 in an open state. Under this effect of the reversing pressure, the stop cylinder 11, the engine brake valve means 9, and the fluid pressure-actuated control cylinder 15 now function in the manner described with respect to the embodiment of the invention illustrated in FIG. 1.

As can be seen from the above description of this embodiment of the invention, the electrically activated valve means 17 can thus be connected to the stop cylinder 11 by way of the fluid pressure-controlled reversing valve 32. Analogous to the previously discussed embodiment, the engine brake valve means 9 can be used to support the DEC/G system 3, 15 and 17 in this case as well. Such support for the DEC/G system 3, 15 and 17 occurs if the maximum signal current does not eliminate an exceeding of the predetermined maximum speed limit. As was the case in the first embodiment, the electronic control system 3 for this purpose must be set up in a manner such that in this case, such electronic control system 3 transmits a signal current which activates the electrically activated valve means 17 to select the reversing pressure. For the reason discussed in conjunction with the first embodiment of the invention, it is expedient in this instance as well, to set up the electronic control system 3 in a manner such that upon start of an antilocking operation by the ALS, such electronic control system 3 will disconnect the engine brake system. To achieve this function in this embodiment, the electronic control system 3 must reduce the signal current to a value that is below the value at which the electrically activated valve means 17 assigns to the reversing pressure. In the event that such engine brake valve means 9 is actuated by way of the switchgear 7, this actuation must be cancelled when the antilocking operation occurs in the ALS. Such cancellation of this actuation of the engine brake valve means 9 can be achieved in an economical manner by providing additional circuit elements in the electronic control system 3. Such additional circuit elements act in a manner familiar to persons who are skilled in the electronics art. For this purpose, the electronic control system 3 may be set up in a manner such that it increases the control pressure again, in stages, to the value that corresponds to the reversing pressure. In a first stage, the electronic control system 3 selects a signal current that is sufficient to move the control means 12 into the idling position (LL).

Figure 3:
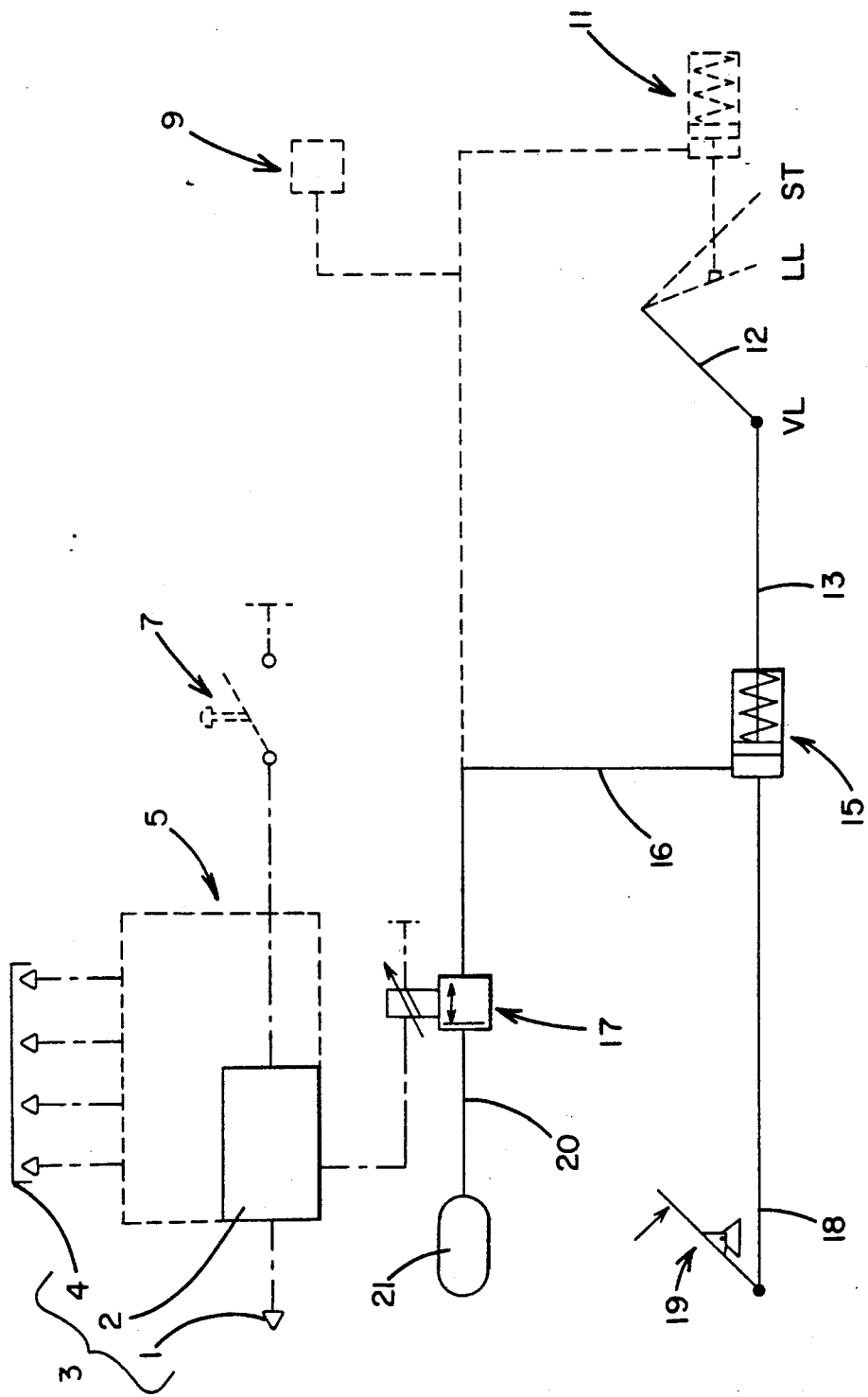
FIG. 3 is a schematic illustration of another alternative embodiment of the combination drive engagement control and speed governor system illustrated in FIG. 2.

The embodiment of the present invention, illustrated in FIG. 2, can be simplified according to the embodiment illustrated in FIG. 3. In the embodiment illustrated in FIG. 3, the stop cylinder 11 and the engine brake valve means 9 are designed in a manner such that they do not respond to fluid pressures that are below the reversing pressure. In that case, such stop cylinder 11 and the engine brake valve means 9 can be connected directly to the electrically activated valve means 17. In this case, the fluid pressure-controlled reversing valve 32 can be omitted.

Figure 4:
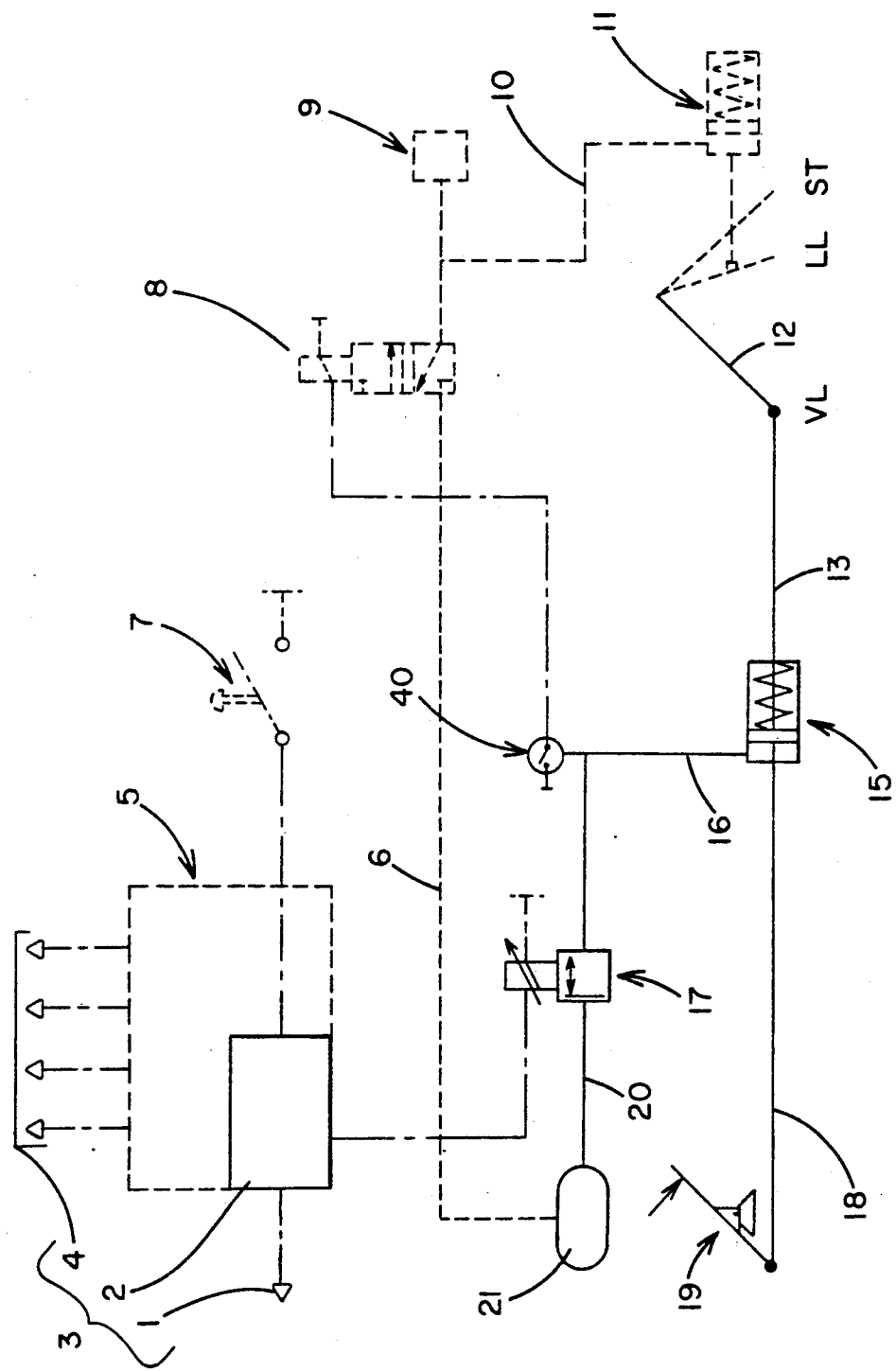
FIG. 4 is a schematic illustration of still another alternative embodiment of the combination drive engagement control and speed governor system illustrated in FIGS. 1 and 2.

The embodiment of the invention, illustrated in FIG. 4, generally corresponds to the embodiment illustrated in FIG. 2. The primary difference between these two embodiments of the invention is that the pressure-dependent control of the fluid pressure-controlled reversing valve means 32 is replaced by an electrical control device and a manometric switch 40. Therefore, the function of the fluid pressure-controlled reversing valve means 32, in this embodiment, is performed by the manometric switch 40 and an engine brake valve means 8. The engine brake valve means 8, in this embodiment, is electrically operated and operates in substantially the same manner as the electrically operated engine brake valve means 8 illustrated in FIG. 1 and discussed above.

The manometric switch 40 is connected, in series, and precedes the engine brake valve means 8. Such manometric switch 40 monitors the pressure of the fluid pressure-actuated control cylinder 15. The pressure monitored by the manometric switch 40 is the pressure selected by the electrically activated valve means 17, which is connected to communicate such fluid pressure to the fluid pressure-actuated control cylinder 15. If this pressure rises to the value of the reversing pressure, then the manometric switch 40 completes the circuit of the engine brake valve means 8. Completion of the circuit to such engine brake valve means 8 results in opening free passage of such reversing pressure. With an appropriate design of the engine brake valve means 8, the manometric switch 40 may also act as a disconnect switch.

As illustrated in FIG. 4, the engine brake valve means 8 withdraws the reversing pressure for the stop cylinder 11 and the engine brake valve means 9 from the fluid pressure medium supply source 21 directly via fluid pressure line 6 of the fluid pressure pipeline system 6 and 10. This withdrawal may also take place at the exit of the electrically activated valve means 17, from the fluid pressure line 16, for example.

Taking into account the primary difference described above, the function of this embodiment of the invention is substantially the same as the function of the embodiment illustrated in FIG. 2.

In this embodiment of the invention, if it becomes desirable for the engine braking system and the engine shut-down system to likewise be actuated voluntarily, then a switchgear 7 must be provided in the apparatus.

Such switchgear 7 has been previously described in conjunction with the embodiment illustrated in FIG. 2.

Generally, except for the engine shut-down system when releasing the motor coupling, it applies that for all of the embodiments illustrated in the drawings and discussed above, that with the same function, a pressure-controlled retarder can be employed instead of or in addition to the engine brake valve means 9. In the case of the embodiments illustrated in FIG. 1 and FIG. 3, the use of an electrically-controlled retarder is also possible. Such electrically-controlled retarder can be controlled by the electrical control signal that is fed to the engine brake valve means 8.

It should be noted that instead of the described combination of the engine shut-down system and engine braking system, these also may be of separate design, in a manner which would be recognized by persons skilled in the art, so that engine shut-down does not occur automatically upon actuation of the engine braking device and the simultaneous release of the clutch. One simple method of achieving this, for example, is to apply the reversing pressure to the stop cylinder 11 from the fluid pressure-actuated control cylinder 15 and the engine brake means 9.

It can be readily seen from the above description of the invention that, compared to prior art devices, the present invention makes possible a simplification of a DEC/G system by substantially reducing the cost for the valve system required. In the prior art system, the valve system is comprised of a distributing valve for the drive engagement control and two distributing valves for the speed governor. In other words, three valves are required in the prior art DEC/G system, whereas, the present invention requires only a single valve device.

Although a number of embodiments of the DEC/G system of the present invention have been described in detail above, it should be obvious to persons skilled in the vehicle control art that various other modifications and adaptations of such DEC/G system may be made without departing from the spirit and scope of the attached claims.

We claim:

1. An apparatus for controlling a detrimental spin of at least one drive wheel and for providing a predetermined drive speed limitation capability on a vehicle, said apparatus comprising:

(a) a control means positionable on such vehicle for determining at least one predetermined operational condition on an engine mounted on such vehicle;

(b) an acceleration control means positioned on such vehicle for enabling an operator of such vehicle to control both an acceleration and a maintenance of a speed of such vehicle;

(c) a linkage means positionable on such vehicle for connecting said acceleration control means with said control means, said linkage means including at least two linkage members;

(d) a fluid pressure-actuated control cylinder positioned in said linkage means intermediate said acceleration control means and said control means, said control cylinder including a piston member positioned for reciprocal movement within a housing portion, said piston member connected at one end thereof to one end of one of said at least two linkage members;

(e) a fluid pressure supply means positioned on such vehicle and connected to said fluid pressure-actuated control cylinder for supplying fluid pressure thereto;

(f) an electrically activated valve means positionable on such vehicle intermediate said fluid pressure supply means and said fluid pressure-actuated control cylinder for controlling fluid communication of a predetermined fluid pressure from said fluid pressure supply means to said fluid pressure-actuated control cylinder when an appropriate control signal is supplied to said electrically activated valve means; and (g) an electronic control system positionable on such vehicle and electrically connected to said electrically activated valve means for transmitting said appropriate control signal to said electrically activated valve means when at least one of at least one drive wheel on such vehicle spins and a maximum admissible drive speed is exceeded, said electronic control system responds in a manner such that when at least said one of spin of said at least one drive wheel and an excess of said maximum allowable drive speed occurs, said electronic control system adjusts said control signal to a valve that is only sufficient to cause said electrically activated valve means to adjust an amount of said predetermined fluid pressure being supplied to said fluid pressure-actuated control cylinder to an amount that is only sufficient for eliminating said at least said one of said spin of said at least one drive wheel and said excess of said maximum allowable drive speed, said piston member positioned for reciprocal movement within said fluid pressure-actuated control cylinder moves to a predetermined position in response to said amount of said predetermined fluid pressure being supplied thereto, movement of said piston member causes a change in position of said one of said at least two linkage members which results in moving said control means in a direction of an idle position (LL) of such engine with an increase in said predetermined fluid pressure being supplied to said fluid pressure-actuated control cylinder, said fluid pressure-actuated control cylinder being capable of making a control stroke which corresponds to movement of said control means between a full load position (VL) and said idle position (LL) of such engine mounted on such vehicle;

(h) said control means being movable in a direction away from said full-load position (VL) via said idle position (LL) into a stopping position (ST) and said apparatus further including a stop cylinder which when receiving at least a reversing pressure from said electrically activated valve means assumes a position that enables said control means to move into said stopping position (ST), and additionally determines the idle position (LL) of said control means; and (i) said electrically activated valve means being connected for fluid communication with said stop cylinder and said stop cylinder having a response pressure of a magnitude of said reversing pressure, said electronic control system transmitting a control signal to said electrically activated valve means which results in fluid communication of at least said reversing pressure to said stop cylinder when a maximum control signal fails exceeding said maximum admissible drive speed.

2. An apparatus, according to claim 1, wherein said fluid pressure-actuated control cylinder responds to said predetermined fluid pressure in a first direction and to a spring biasing means in a substantially axially opposite second direction.

3. An apparatus, according to claim 1, wherein said electronic control system forms a portion of an antilocking brake system on such vehicle.

4. An apparatus, according to claim 1, wherein said fluid pressure-actuated control cylinder includes a predetermined response pressure and said electronic control system is set up such that a minimum control signal to be transmitted by said electronic control system is essentially sufficient only to drive said electrically activated valve means to select said predetermined response pressure of said fluid pressure-actuated control cylinder.

5. An apparatus, according to claim 4, wherein said electronic control system is set up such that a maximum control signal to be transmitted by said electronic control system to eliminate said at least said one of spin of said at least one drive wheel and said excess of said maximum allowable drive speed is sufficient only to drive said electrically controlled valve means to a position which enables a fluid pressure communication to said fluid pressure-actuated control cylinder which moves said control means into said idle position (LL) with said acceleration control means fully actuated.

6. An apparatus, according to claim 1, wherein said control signal transmitted by said electronic control system is a mean value of a pulse-width modulated signal transmitted by said electronic control system.

7. An apparatus, according to claim 5, wherein said electronic control system is calibrated with respect to said minimum control signal and said maximum control signal.

8. An apparatus, according to claim 7, wherein respective calibration values are learned by said electronic control system.

9. An apparatus, according to claim 1, wherein said apparatus further includes a series-connected switchgear which is connected to and preceding said electronic control system, said series-connected switchgear upon actuation results in said electronic control system transmitting said control signal to said electrically activated valve means, thereby causing said electrically operated valve means to at least communicate said reversing pressure to said stop cylinder.

10. An apparatus, according to claim 1, wherein said electronic control system is part of an antilocking system and wherein during an operation of said antilocking system, said electronic control system reduces said appropriate control signal to a value below a value corresponding to said reversing pressure.

11. An apparatus, according to claim 1, wherein said electronic control system is part of an antilocking system and upon termination of an operation of said antilocking system, said electronic control system again increases a control pressure, in stages, to a value at least corresponding to said reversing pressure of said stop cylinder, and in a first stage said electronic control system transmits a control signal that is sufficient only to move said control means into said idle position (LL).

12. An apparatus for controlling a detrimental spin of at least one drive wheel and for providing a predetermined drive speed limitation capability on a vehicle, said apparatus comprising:

(a) a control means positionable on such vehicle for determining at least one predetermined operational condition on an engine mounted on such vehicle;

(b) an acceleration control means positioned on such vehicle for enabling an operator of such vehicle to control both an acceleration and a maintenance of a speed of such vehicle;

(c) a linkage means positionable on such vehicle for connecting said acceleration control means with said control means, said linkage means including at least two linkage members;

(d) a fluid pressure-actuated control cylinder positioned in said linkage means intermediate said acceleration control means and said control means, said control cylinder including a piston member positioned for reciprocal movement within a housing portion, said piston member connected at one end thereof to one end of one of said at least two linkage members;

(e) a fluid pressure supply means positioned on such vehicle and connected to said fluid pressure-actuated control cylinder for supplying fluid pressure thereto;

(f) an electrically activated valve means positionable on such vehicle intermediate said fluid pressure supply means and said fluid pressure-actuated control cylinder for controlling fluid communication of a predetermined fluid pressure from said fluid pressure supply means to said fluid pressure-actuated control cylinder when an appropriate control signal is supplied to said electrically activated valve means; and (g) an electronic control system positionable on such vehicle and electrically connected to said electrically activated valve means for transmitting said appropriate control signal to said electrically activated valve means when at least one of at least one drive wheel on such vehicle spins and a maximum admissible drive speed is exceeded, said electronic control system responds in a manner such that when at least said one of spin of said at least one drive wheel and an excess of said maximum allowable drive speed occurs, said electronic control system adjusts said control signal to a value that is only sufficient to cause said electrically activated valve means to adjust an amount of said predetermined fluid pressure being supplied to said fluid pressure-actuated control cylinder to an amount that is only sufficient for eliminating said at least said one of said spin of said at least on drive wheel and said excess of said maximum allowable drive speed, said piston member positioned for reciprocal movement within said fluid pressure-actuated control cylinder moves to a predetermined position in response to said amount of said predetermined fluid pressure being supplied thereto, movement of said piston member causes a change in position of said one of said at least two linkage members which results in moving said control means in a direction of an idle position (LL) of such engine with an increase in said predetermined fluid pressure being supplied to said fluid pressure-actuated control cylinder, said fluid pressure-actuated control cylinder being capable of making a control stroke which corresponds to movement of said control means between a full load position (VL) and said idle position (LL) of such engine mounted on such vehicle;

(h) said control means being movable in a direction away from said full-load position (VL) via said idle position (LL) into a stopping position (ST) and said apparatus further including a stop cylinder which when at least a reversing pressure from an engine brake valve means is applied to said stop cylinder assumes a position that enables said control means to move into said stopping position (ST), and additionally determines the idle position (LL) of said control means; and (i) said reversing pressure being greater than a pressure determining said control stroke of said fluid pressure-actuated control cylinder and said fluid pressure-actuated control cylinder, upon application of said reversing pressure, producing a stroke beyond said control stroke, thereby changing a position of said linkage means to move said control means into said stopping position (ST), and said apparatus further including an engine brake valve means connected with said stop cylinder and said fluid pressure-actuated control cylinder in a manner such that at least said reversing pressure can be applied to said stop cylinder and parallel to said electrically controlled valve means to said fluid pressure-actuated control cylinder.

13. An apparatus, according to claim 12, wherein said engine brake valve means is electrically controlled and is electrically connected to said electronic control system so that if a maximum control signal allows exceeding a maximum speed, then said electronic control system transmits a signal which actuates said electrically operated engine brake valve means.

14. An apparatus, according to claim 13, wherein said signal which actuates said electrically operated engine brake valve means is interconnected through said electronic control system.

15. An apparatus, according to claim 14, wherein said electronic control system is part of an antilocking system and wherein said electrically controlled engine brake valve means is deactivated by said electronic control system during operation of said antilocking system.

16. An apparatus, according to claim 12, wherein said electronic control system is part of an antilocking system and, upon termination of an operation of said antilocking system and prior to an actuation of said engine brake valve means which was actuated before said operation of said antilocking system, said electronic control system, in a first stage, transmits a control signal sufficient only to move said control means into said idle position (LL).

17. An apparatus, according to claim 12, wherein said fluid pressure-actuated control cylinder responds to said predetermined fluid pressure in a first direction and to a spring biasing means in a substantially axially opposite second direction.

18. An apparatus, according to claim 12, wherein said electronic control system forms a portion of an antilocking brake system on such vehicle.

19. An apparatus, according to claim 12, wherein said fluid pressure-actuated control cylinder includes a predetermined response pressure and said electronic control system is set up such that a minimum control signal to be transmitted by said electronic control system is essentially sufficient only to drive said electrically activated valve means to select said predetermined response pressure of said fluid pressure-actuated control cylinder.

20. An apparatus, according to claim 19, wherein said electronic control system is set up such that a maximum control signal to be transmitted by said electronic control system to eliminate said at least said one of spin of said at least one drive wheel and said excess of said maximum allowable drive speed is sufficient only to drive said electrically controlled valve means to a position which enables a fluid pressure communication to said fluid pressure-actuated control cylinder which moves said control means into said idle position (LL) with said acceleration control means fully actuated.

21. An apparatus, according to claim 12, wherein said control signal transmitted by said electronic control system is a mean value of a pulse-width modulated signal transmitted by said electronic control system.

22. An apparatus, according to claim 20, wherein said electronic control system is calibrated with respect to said minimum control signal and said maximum control signal.

23. An apparatus, according to claim 22, wherein respective calibration values are learned by said electronic control system.

24. An apparatus for controlling a detrimental spin of at least one drive wheel and for providing a predetermined drive speed limitation capability on a vehicle, said apparatus comprising:

(a) a control means positionable on such vehicle for determining at least one predetermined operational condition on an engine mounted on such vehicle;

(b) an acceleration control means positioned on such vehicle for enabling an operator of such vehicle to control both an acceleration and a maintenance of a speed of such vehicle;

(c) a linkage means positionable on such vehicle for connecting said acceleration control means with said control means, said linkage means including at least two linkage members;

(d) a fluid pressure-actuated control cylinder positioned in said linkage means intermediate said acceleration control means and said control means, said control cylinder including a piston member positioned for reciprocal movement within a housing portion, said piston member connected at one end thereof to one end of one of said at least two linkage members;

(e) a fluid pressure supply means positioned on such vehicle and connected to said fluid pressure-actuated control cylinder for supplying fluid pressure thereto;

(f) an electrically activated valve means positionable on such vehicle intermediate said fluid pressure supply means and said fluid pressure-actuated control cylinder for controlling fluid communication of a predetermined fluid pressure from said fluid pressure supply means to said fluid pressure-actuated control cylinder when an appropriate control signal is supplied to said electrically activated valve means; and (g) an electronic control system positionable on such vehicle and electrically connected to said electrically activated valve means for transmitting said appropriate control signal to said electrically activated valve means when at least one of at least one drive wheel on such vehicle spins and a maximum admissible drive speed is exceeded, said electronic control system responds in a manner such that when at least said one of spin of said at least one drive wheel and an excess of said maximum allowable drive speed occurs, said electronic control system adjusts said control signal to a value that is only sufficient to cause said electrically activated valve means to adjust an amount of said predetermined fluid pressure being supplied to said fluid pressure-actuated control cylinder to an amount that is only sufficient for eliminating said at least said one of said spin of said at least one drive wheel and said excess of said maximum allowable drive speed, said piston member positioned for reciprocal movement within said fluid pressure-actuated control cylinder moves to a predetermined position in response to said amount of said predetermined fluid pressure being supplied thereto, movement of said piston member causes a change in position of said one of said at least two linkage members which results in moving said control means in a direction of an idle position (LL) of such engine with an increase in said predetermined fluid pressure being supplied to said fluid pressure-actuated control cylinder, said fluid pressure-actuated control cylinder being capable of making a control stroke which corresponds to movement of said control means between a full load position (VL) and said idle position (LL) of such engine mounted on such vehicle;

(h) said control means being movable in a direction away from said full-load position (VL) via said idle position (LL) into a stopping position (ST) and said apparatus further including a stop cylinder which when at least a reversing pressure from a fluid pressure-controlled reversing valve means is applied to said stop cylinder assumes a position that enables said control means to move into said stopping position (ST), and additionally determines the idle position (LL) of said control means; and (i) said apparatus further including a fluid pressure-controlled reversing valve means for connecting said electrically activated valve means with said stop cylinder, said fluid pressure-controlled reversing valve means opening a fluid communication connection between said electrically activated valve means and said stop cylinder when at least said reversing pressure is applied and otherwise closes said fluid communication connection to provide pressure relief for said stop cylinder, and if a maximum control signal transmitted by said electronic control system fails to eliminate exceeding said maximum admissible drive speed, then said electronic control system will transmit a control signal to said electrically activated valve means which results in said electrically activated valve means communicating at least said reversing pressure to said stop cylinder.

25. An apparatus, according to claim 24, wherein said apparatus further includes a series-connected switchgear which is connected to and preceding said electronic control system, said series-connected switchgear upon actuation results in said electronic control system transmitting said control signal to said electrically activated valve means, thereby causing said electrically operated valve means to at least communicate said reversing pressure to said stop cylinder.

26. An apparatus, according to claim 24, wherein said apparatus further includes a stop cylinder and during an operation of said antilocking system, said electronic control system reduces said appropriate control signal to a value below a value corresponding to a reversing pressure of said stop cylinder.

27. An apparatus, according to claim 24, wherein said fluid pressure-actuated control cylinder responds to said predetermined fluid pressure in a first direction and to a spring biasing means in a substantially axially opposite second direction.

28. An apparatus, according to claim 24, wherein said electronic control system forms a portion of an antilocking brake system on such vehicle.

29. An apparatus, according to claim 24, wherein said fluid pressure-actuated control cylinder includes a predetermined response pressure and said electronic control system is set up such that a minimum control signal to be transmitted by said electronic control system is essentially sufficient only to drive said electrically activated valve means to select said predetermined response pressure of said fluid pressure-actuated control cylinder.

30. An apparatus, according to claim 29, wherein said electronic control system is set up such that a maximum control signal to be transmitted by said electronic control system to eliminate said at least said one of spin of said at least one drive wheel and said excess of said maximum allowable drive speed is sufficient only to drive said electrically controlled valve means to a position which enables a fluid pressure communication to said fluid pressure-actuated control cylinder which moves said control means into said idle position (LL) with said acceleration control means fully actuated.

31. An apparatus, according to claim 24, wherein said control signal transmitted by said electronic control system is a mean value of a pulse-width modulated signal transmitted by said electronic control system.

32. An apparatus, according to claim 30, wherein said electronic control system is calibrated with respect to said minimum control signal and said maximum control signal.

33. An apparatus, according to claim 32, wherein respective calibration values are learned by said electronic control system.

34. An apparatus, according to claim 24, wherein said electronic control system is part of an antilocking system and upon termination of an operation of said antilocking system, said electronic control system again increases a control pressure, in stages, to a value at least corresponding to said reversing pressure of said stop cylinder, and in a first stage said electronic control system transmits a control signal that is sufficient only to move said control means into said idle position (LL).

35. An apparatus for controlling a detrimental spin of at least one drive wheel and for providing a predetermined drive speed limitation capability on a vehicle, said apparatus comprising:

(a) a control means positionable on such vehicle for determining at least one predetermined operational condition on an engine mounted on such vehicle;

(b) an acceleration control means positioned on such vehicle for enabling an operator of such vehicle to control both an acceleration and a maintenance of a speed of such vehicle;

(c) a linkage means positionable on such vehicle for connecting said acceleration control means with said control means, said linkage means including at least two linkage members;

(d) a fluid pressure-actuated control cylinder positioned in said linkage means intermediate said acceleration control means and said control means, said control cylinder including a piston member positioned for reciprocal movement within a housing portion, said piston member connected at one end thereof to one end of one of said at least two linkage members;

(e) a fluid pressure supply means positioned on such vehicle and connected to said fluid pressure-actuated control cylinder for supplying fluid pressure thereto;

(f) an electrically activated valve means positionable on such vehicle intermediate said fluid pressure supply means and said fluid pressure-actuated control cylinder for controlling fluid communication of a predetermined fluid pressure from said fluid pressure supply means to said fluid pressure-actuated control cylinder when an appropriate control signal is supplied to said electrically activated valve means; and (g) an electronic control system positionable on such vehicle and electrically connected to said electrically activated valve means for transmitting said appropriate control signal to said electrically activated valve means when at least one of at least one drive wheel on such vehicle spins and a maximum admissible drive speed is exceeded, said electronic control system responds in a manner such that when at least said one of spin of said at least one drive wheel and an excess of said maximum allowable drive speed occurs, said electronic control system adjusts said control signal to a value that is only sufficient to cause said electrically activated valve means to adjust an amount of said predetermined fluid pressure being supplied to said fluid pressure-actuated control cylinder to an amount that is only sufficient for eliminating said at least said one of said spin of said at least one drive wheel and said excess of said maximum allowable drive speed, said piston member positioned for reciprocal movement within said fluid pressure-actuated control cylinder moves to a predetermined position in response to said amount of said predetermined fluid pressure being supplied thereto, movement of said piston member causes a change in position of said one of said at least two linkage members which results in moving said control means in a direction of an idle position (LL) of such engine with an increase in said predetermined fluid pressure being supplied to said fluid pressure-actuated control cylinder, said fluid pressure-actuated control cylinder being capable of making a control stroke which corresponds to movement of said control means between a full load position (VL) and said idle position (LL) of such engine mounted on such vehicle;

(h) said control means being movable in a direction away from said full-load position (VL) via said idle position (LL) into a stopping position (ST) and said apparatus further including a stop cylinder which when receiving at least a reversing pressure from an electrically controlled engine brake valve means assumes a position that enables said control means to move into said stopping position (ST), and additionally determines the idle position (LL) of said control means;

(i) an electrically controlled engine brake valve means connected in fluid communication with said stop cylinder, and electrically connected to said electronic control system for communicating at least said reversing pressure to said stop cylinder; and (j) a manometric switch means electrically series-connected ahead of said electrically controlled engine brake valve means for monitoring a pressure present in said fluid pressure-actuated control cylinder, and switching in response to said reversing pressure said reversing pressure being higher than a control stroke determining said control stroke of said fluid pressure-actuated control cylinder, said fluid pressure-actuated control cylinder being operable such that when said reversing pressure is applied to it, said fluid pressure-actuated control cylinder produces a stroke going beyond said control stroke thereby moving said linkage means to a position to move said control means into said stopping position (ST), and when a maximum control signal fails to eliminate exceeding of said maximum admissible drive speed, said electronic control system transmits a control signal to said electrically activated valve means which results in a communication of at least said reversing pressure to said stop cylinder.

36. An apparatus, according to claim 35, wherein said apparatus further includes a switchgear series-connected ahead of said electronic control system which, upon actuation, results in said electronic control system transmitting said control signal to said electrically activated valve means which results in a communication of at least said reversing pressure to said stop cylinder.

37. An apparatus according to claim 35, wherein said electronic control system is part of an antilocking system, and said electronic control system reduces said control signal below a value corresponding to said reversing pressure during operation of said antilocking system.

38. An apparatus, according to claim 37, wherein said electronic control system, upon termination of an operation of said antilocking system, again increases in stages, a control pressure to a value corresponding at least to said reversing pressure, and in a first stage said electronic control transmits a control signal sufficient only to move said control means into said idle position.

39. An apparatus, according to claim 35, wherein said fluid pressure-actuated control cylinder responds to said predetermined fluid pressure in a first direction and to a spring biasing means in a substantially axially opposite second direction.

40. An apparatus, according to claim 35, wherein said electronic control system forms a portion of an antilocking brake system on such vehicle.

41. An apparatus, according to claim 35, wherein said fluid pressure-actuated control cylinder includes a predetermined response pressure and said electronic control system is set up such that a minimum control signal to be transmitted by said electronic control system is essentially sufficient only to drive said electrically activated valve means to select said predetermined response pressure of said fluid pressure-actuated control cylinder.

42. An apparatus, according to claim 41, wherein said electronic control system is set up such that a maximum control signal to be transmitted by said electronic control system to eliminate said at least said one of spin of said at least one drive wheel and said excess of said maximum allowable drive speed is sufficient only to drive said electrically controlled valve means to a position which enables a fluid pressure communication to said fluid pressure-actuated control cylinder which moves said control means into said idle position (LL) with said acceleration control means fully actuated.

43. An apparatus, according to claim 35, wherein said appropriate control signal transmitted by said electronic control system is a mean value of a pulse-width modulated signal transmitted by said electronic control system.

44. An apparatus, according to claim 42, wherein said electronic control system is calibrated with respect to said minimum control signal and said maximum control signal.

45. An apparatus, according to claim 44, wherein respective calibration values are learned by said electronic control system.

* * * * *